United States Patent

Samra

[15] 3,656,104
[45] Apr. 11, 1972

[54] ADVANCE ANTI-LOCKOUT VEHICLE PARKING SIGNAL HAVING ADJUSTABLE DECK MOUNTED BRACKETS

[72] Inventor: Herb G. Samra, 1606 North 74th Court, Elmwood Park, Ill. 60635

[22] Filed: June 4, 1970

[21] Appl. No.: 43,370

[52] U.S. Cl. ................................................340/95, 340/97
[51] Int. Cl. .......................................B60q 1/00, B60q 1/46
[58] Field of Search ................................................340/95, 97

[56] References Cited

UNITED STATES PATENTS

| | | | |
|---|---|---|---|
| 2,866,175 | 12/1958 | Slater | 340/95 X |
| 2,939,108 | 5/1960 | McIntire | 340/97 X |
| 3,351,904 | 11/1967 | Noruk | 340/97 |

*Primary Examiner*—Harold I. Pitts
*Attorney*—Hill, Sherman, Meroni, Gross & Simpson

[57] ABSTRACT

A visual signal device for vehicles effectively providing an advance clear warning, which cannot be misinterpreted, of intent to take a position in traffic for parking the vehicle so that following vehicles or pedestrians may maneuver in advance to prevent a traffic jam or avoid injury. The device produces a flashing conspicuous parking message which is manually controlled and not interrupted by any automatic mechanisms on the vehicle. A preferred form of the device is easily mounted on the rear shelf or deck of a vehicle at a selected height and distance from the rear window of the vehicle so as to provide an unobstructed rear view and so as to be clearly visible through the window from the rear of the vehicle. A feature includes a tiltable adjustment for the device so as to beam the signal at the most effective angle.

1 Claims, 10 Drawing Figures

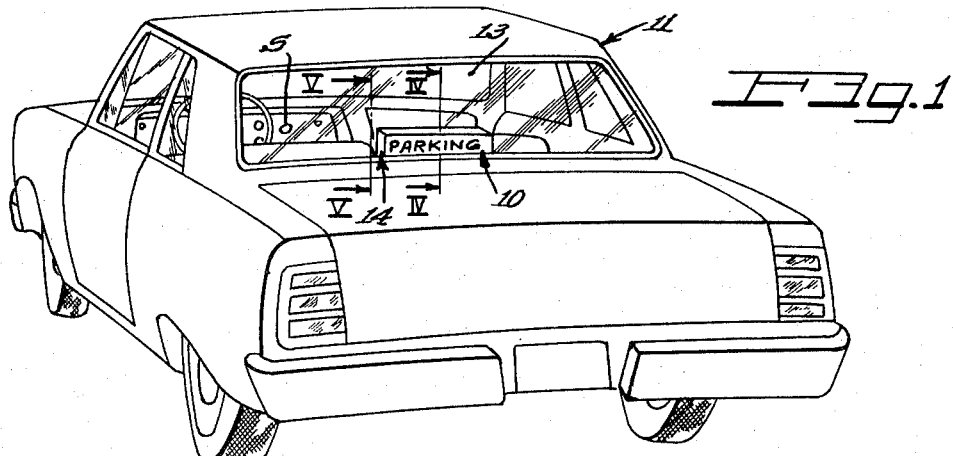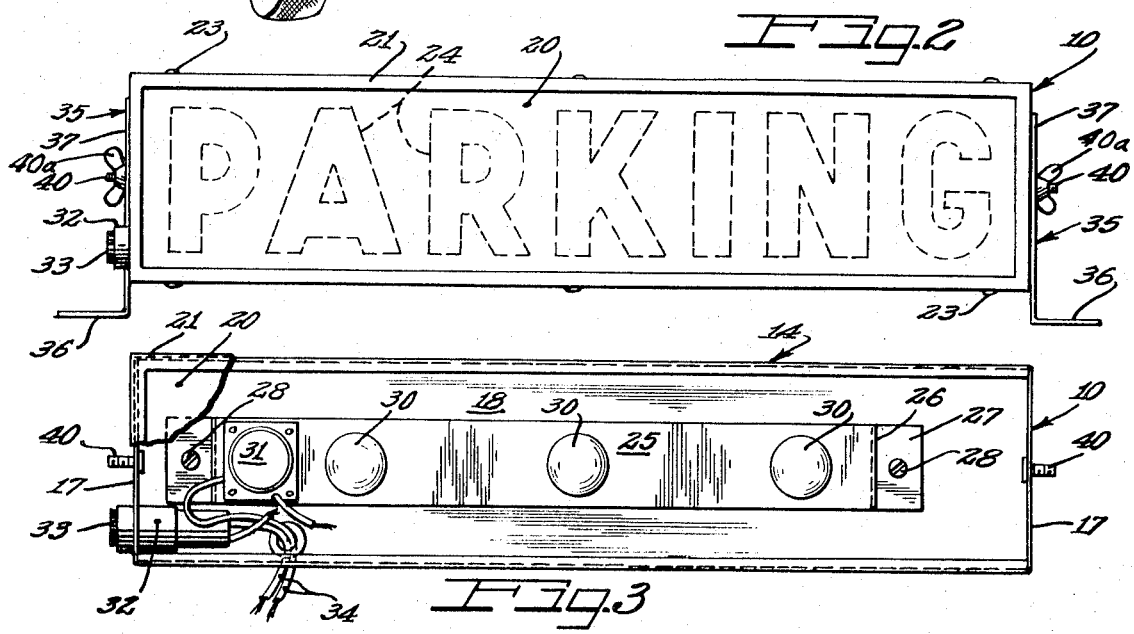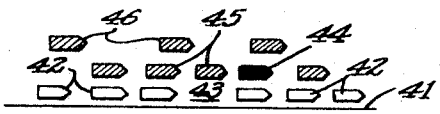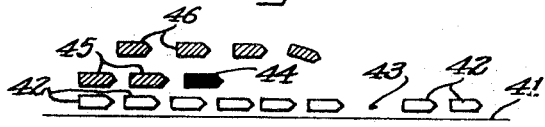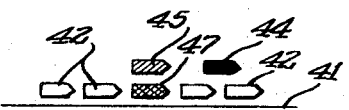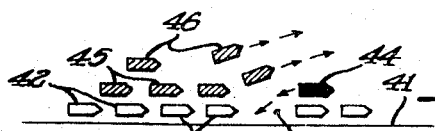

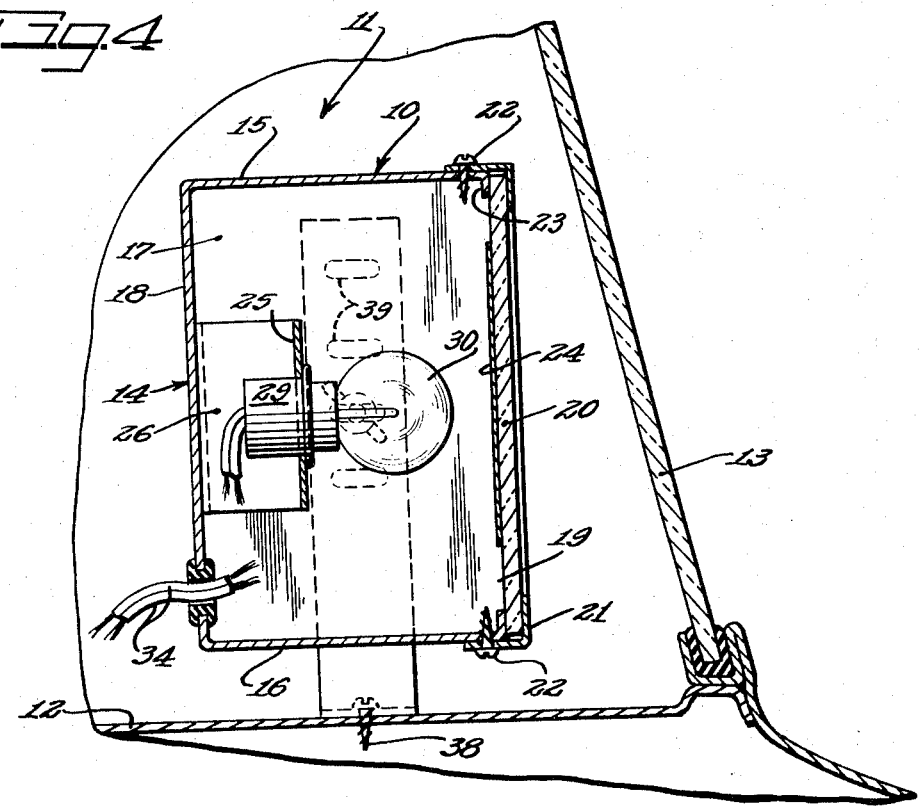
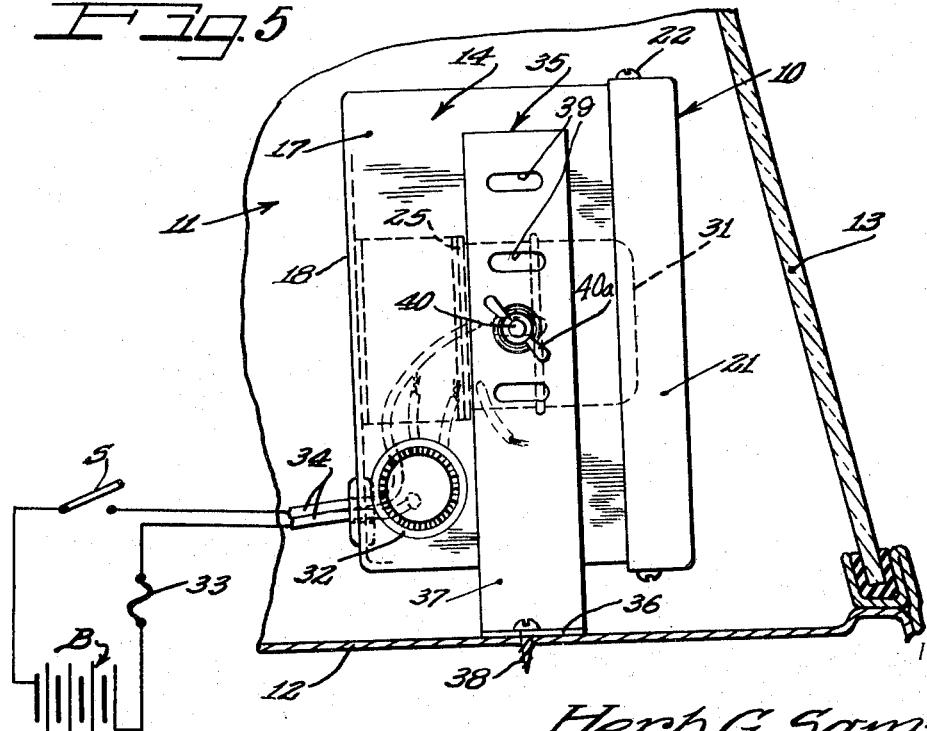

ADVANCE ANTI-LOCKOUT VEHICLE PARKING SIGNAL HAVING ADJUSTABLE DECK MOUNTED BRACKETS

BACKGROUND OF THE INVENTION

1. Field of the Invention

This invention relates to the art of visual signalling systems for vehicles and, more particularly, pertains to a device for projecting a flashing word message rearwardly from a vehicle to warn following traffic of intention to park so that the oncoming traffic may maneuver in advance and prevent locking out of one vehicle by another from backing into a parking space.

2. Description of the Prior Art

Conventional automotive vehicle lights such as stop lights, flash or emergency lights, and turn signal lights are automatically interrupted by releasing the brakes, by propelling the vehicle, by turning the wheels, and the like. Such signals cannot give an advance indication or warning of intent to park the vehicle. The prior art has not heretofore provided an effective indicator that will signal in advance to oncoming traffic that the vehicle is to pull into a parking space and will provide an opportunity for following vehicles to maneuver out of position so that traffic will not be blocked and the parking space will be reserved for the signalling vehicle.

SUMMARY OF THE INVENTION

This invention now provides a driver controlled visual signal device for vehicles which is independent of any other signalling systems on the vehicle and which will command attention of the occupants of following vehicles that the driver is about to park, thereby permitting the following vehicles to swing around the signalling vehicle while it is still moving, thus preventing a traffic jam or a lockout of the available parking space. The signal of the device of this invention is visible only when manually activated and when so activated commands attention at night, in fog, in daylight, and even in bright sunlight. The preferred device is easily installed on the rear platform or deck between the rear seat and rear window of an automotive vehicle, and is positioned thereon at an adjusted height and distance relative to the window and at an adjusted angle so as not to interfere with vision through the rear window, while at the same time being capable of projecting a flashing light signal through the window to any following vehicle.

The preferred device has a casing mounting a plurality of flashing lights and having a window, preferably of translucent material, with a word message such as "PARKING" on the inside face of the window visible through the window only when the lights are lit. The casing carries a flasher unit and a fuse directly connected to the vehicle battery so as to be independent of all other vehicle equipment. A switch adjacent the driver is manually actuated to supply current to the lights, and the fuse is easily replaceable from the outside of the casing so as to inactivate the unit if desired.

A feature of the preferred unit of this invention is the provision of mounting brackets with feet portions easily secured to the shelf or deck of the vehicle between the seat and rear window with self-tapping screws and having upstanding legs straddling the ends of the casing and provided with horizontal slots accommodating mounting of the casing at a selected height relative to the deck or shelf and at a selected distance from the rear window to insure full visibility of the signal through the rear window without interfering with rear vision. The slots of the mounting brackets receive studs projecting from the ends of the casing and wing nuts on the studs press the brackets against the end walls of the casing to lock the casing in adjusted position. The casing can also be tilted relative to the brackets so that the signal will be beamed at a desired angle through the rear window of the vehicle.

It is then an object of this invention to provide a signalling system for vehicles which is independent of any other signal on the vehicle and which is effective to provide an advance warning of the intent to take a position for parking the vehicle so that following vehicles may plan their maneuvers in advance to prevent a lockout or traffic jam.

Another object of this invention is to provide a parking signal for automotive vehicles which will give an advance warning of intent to park by providing a flashing word message commanding attention of occupants of following vehicles.

A specific object of this invention is to provide a signal unit easily mounted on the rear deck of a vehicle between the rear window and the back of the seat at a height selected distance from the rear window, at a and at an angle that will project an attention-commanding flashing signal through the rear window without interfering with the rear vision of the driver of the vehicle.

Another specific object of this invention is to provide a parking signal unit for automotive vehicles having a casing mounting a plurality of lightbulbs, and carrying a translucent rear window with tinted plastic indicia on the inner face thereof spelling "PARKING" and having a flasher unit mounted therein in series with the lightbulbs together with brackets for attaching the casing at a desired height and at a desired angle to the rear deck of a vehicle.

Other and further objects of this invention will be apparent to those skilled in this art from the following detailed description of the annexed sheets of drawings, which, by way of the preferred example, illustrate one embodiment of the invention.

BRIEF DESCRIPTION OF THE DRAWINGS

FIG. 1 is a rear end perspective view of an automotive vehicle equipped with a signal device of this invention;

FIG. 2 is a rear elevational view of the signal unit shown in FIG. 1;

FIG. 3 is a view similar to FIG. 2 but with the window broken away to show underlying parts;

FIG. 4 is an enlarged fragmentary vertical sectional view along the line IV—IV of FIG. 1;

FIG. 5 is a view similar to FIG. 4 but taken along the section line V—V of FIG. 1 and also showing a wiring diagram;

FIGS. 6, 7 and 8 are diagrams illustrating a use of the device of this invention to prevent traffic jams;

FIGS. 9 and 10 are diagrammatic views illustrating the use of the device of this invention to prevent locking in of a vehicle about to leave a parking space, and to prevent locking out of a vehicle contemplating entering the space when available.

DESCRIPTION OF THE PREFERRED EMBODIMENT

As shown in FIGS. 1, 4 and 5, the signalling unit 10 of this invention is illustrated as mounted in the passenger compartment of an automobile 11 on the deck 12 in front of the rear window 13.

The unit 10 is composed of a metal or plastic rectangular casing 14 with top and bottom walls 15 and 16, end walls 17, a front wall 18, and a rear opening 19 covered by a window 20. The window 20 is held on the rear face of the casing 14 by a frame 21 overlying the margin of the window and having a flange surrounding the open end of the casing and secured thereto as by screws 22. The window, as shown in FIG. 4, is held by the frame 21 against an inturned flange 23 surrounding the opening 19.

The window 20 is composed of translucent material such as frosted glass, plastic or the like, preferably tinted amber, or red, although a white frosted window is useful. This translucent window 20 carries on its inner face plastic material 24, preferably black, spelling out the word "PARKING" as shown in FIG. 2. The word is preferably only visible through the translucent window 20 when lights in the casing are lit. Alternately, of course, the indicia could be painted on the inner face of the window. Further, the signal could be spelled out on a frosted glass by transparent portions not readily visible unless the lights in the casing are lit.

The casing 14 has a light socket mounting strip 25 carried on the front wall 18. This strip 25 has end legs 26 with outturned feet 27 resting on the front wall 18 of the casing and secured thereto as by fasteners 28. The main body of the strip 25 is thus spaced rearwardly from the wall 18 and carries a plurality of lamp sockets 29 in spaced relation along the length thereof. Lamp bulbs 30 are carried in these sockets and project rearwardly from the strip to light up the window 20. Three lightbulbs 30 have been illustrated, but it should be understood that any number could be used to insure a good bright lighting of the window to project the visual signal in an attention-demanding manner through the rear window 13 of the vehicle to the occupants of following vehicles even though the following vehicles are considerably behind the vehicle 11.

The mounting strip 25 also carries adjacent one end thereof a flasher unit 31 which will periodically interrupt current flow to the bulbs 30 so as to give a flashing "PARKING" signal.

One end wall 17 of the casing carries a thimble 32 mounting a replaceable fuse 33 which is easily accessible from outside of the casing. Wiring 34 connects the lightbulbs 30, the flasher unit 31 and the fuse 33 in series with the vehicle battery B (FIG. 5). A manually actuated switch S is mounted in the vehicle adjacent the steering wheel such as on the dashboard as shown in FIG. 1 so that current from the battery B can be selectively supplied through the wiring 34 to the lightbulbs 30. The fuse 33 is easily removed from the thimble 32 from the outside of the casing 14 so as to inactivate the signal device when desired.

L-shaped brackets 35 straddle the casing 14 and have outwardly projecting feet 36 and upstanding legs 37. The feet 36 rest on the deck 12 as shown in FIGS. 4 and 5 and receive fasteners 38 piercing the deck for mounting the brackets to the deck. The legs 37 press tightly against the end walls 17 of the casing 14 and have a plurality of horizontal slots 39 at vertically spaced intervals across the upper portions of the legs 37. Studs 40 projecting from the end walls 17 of the casing about midway between the top wall 15 and bottom wall 16 and also about midway between the front wall 18 and the window 20 project through a selected slot 39 of each bracket to mount the casing 14 at a desired height above the deck 12. The horizontal slots also provide for adjustment toward and away from the rear window 13. Wing nuts 40a are threaded on the studs 40 to clamp the legs 37 of the brackets tightly against the end walls 17 of the casing and to lock the casing to the brackets.

It will be understood that the casing 14 may be positioned close to or at a distance from the rear window 13 and close to or at a distance above the deck 12 to best project the signal through the rear window 13 without interfering with rear window vision. Further, it will be understood that the casing may be tilted relative to the brackets so that the signal may be projected at a desired angle to command attention to the occupants of following vehicles.

When the switch S is closed by the driver of the vehicle 11, the lightbulbs 30 will flash on and off and the legend "-PARKING" will be flashed in a very effective manner to command attention, whereas when the switch S is open, the word "PARKING" is either invisible or so inconspicuous as to be overlooked by the occupants of following vehicles.

In the diagrams of FIGS. 6-8, the small pointed rectangles designate vehicles such as 11. In each figure the line 41 represents a curb along a right-of-way, a line of vehicles 42 are parked along this curb 41 and only a single parking space 43 is available. As is customary, a vehicle 44 desiring to enter the parking space 43 must pull ahead of this space and then attempt to back into the space as shown in FIG. 6. This position of the vehicle 44 blocks off the row of following vehicles 45 and, as frequently happens in congested areas, these vehicles cannot pull out from behind the vehicle 44 because of the vehicles 46 passing along the next adjacent lane. Under these conditions, a traffic jam will occur and the vehicle 44 is locked out from the parking space 43 by the closely following vehicle 45.

On the other hand, if the vehicle 44 is equipped with the signalling device 10 of this invention, the signal will be given before the vehicle 44 reaches the parking space 43 as shown in FIG. 7 and while all vehicles are still moving, the following vehicles 45 can swing out into the lane of vehicles 46 and then swing back in front of the vehicle 44 without stopping or blocking out the space 43. Then, as the vehicle 44 is advanced to the position where it must stop ahead of the space 43 in order to back into the space, as shown in FIG. 8, traffic flow of the vehicles 45 and 46 is uninterrupted.

FIGS. 6-8 therefore illustrate how the device 10 of this invention is used to give an advance warning of intent to take a position to park a motor vehicle so that vehicles from behind may plan their maneuvers in advance to prevent a traffic jam or lockout condition.

FIGS. 9 and 10 illustrate how the device of this invention will prevent a vehicle about to leave a parking space from being locked into the space by a vehicle following the vehicle intending to occupy the released space. Thus, as shown in FIG. 9, the line of vehicles 42 parked along the curb 41 includes a vehicle 47 about to leave the line and provide an empty space. The driver of the vehicle 44, seeing that the vehicle 47 is about to leave the space, has pulled ahead of the space to become available at sufficient distance to permit the vehicle 47 to leave the space. However, the driver of a following vehicle 45, not aware of the intent of the driver of the vehicle 44 to back into the space about to become available, will pull up behind the vehicle 44 to the position shown in FIG. 10, thereby not only blocking out the vehicle 44 from the space, but also locking the vehicle 47 in the space. This condition will be avoided by the device 10 of this invention since the driver of the vehicle 45 will have sufficient advance warning of the intent of the driver of the vehicle 44 to back into the space to be made available by exiting of the vehicle 47 and will swing out of the way of both vehicles.

It will be understood, of course, that while it is preferred to mount the device 10 of this invention inside of the vehicle 11 in front of the rear window 13, the device could also be mounted outside of the vehicle in any position so as to project an effective attention-getting signal to the occupants of following vehicles.

It will, of course, be understood that only a preferred embodiment of this invention has been illustrated and that variations and modifications of the illustrations may be effected without departing from the spirit and scope of the invention.

I claim as my invention:

1. A complete parking signal unit for mounting on the rear deck of an automotive vehicle in front of the rear window thereof which comprises a rectangular casing having top, bottom, end and front walls with an elongated rectangular window in the rear thereof, electrical illuminating means in said casing behind said window, indicia displaying the word "-PARKING" through said window not noticeable until said illuminating means are lit, a flasher unit in said casing, replaceable fuse means, a driver actuated switch, an electrical circuit including the driver actuated switch, the flasher unit, the replaceable fuse means and the illuminating means for energizing the illuminating means when the switch is closed to produce a flashing attention-attracting display of the word "-PARKING", brackets straddling the end walls of the casing, fasteners adapted for mounting the brackets in upright positions on the deck of the vehicle at a desired position relative to the rear window of the vehicle, said brackets each having a plurality of slots for vertical and horizontal adjustment, studs projecting from the ends of the casing into selected slots to position the casing at a desired height above the deck and nuts threaded on the studs to secure the casing to the brackets at an adjustable horizontal distance from the rear window and at an adjusted angle relative to the deck to beam the message "-PARKING" through the rear window in a direction and at a level to effectively command attention, whereby the driver of the vehicle, upon manually closing the switch provides an advance warning to following traffic of his intent to park the vehicle.

* * * * *

UNITED STATES PATENT OFFICE
CERTIFICATE OF CORRECTION

Patent No. 3,656,104   Dated April 11, 1972

Inventor(s) Herb G. Samra

It is certified that error appears in the above-identified patent and that said Letters Patent are hereby corrected as shown below:

> Column 2, lines 9, 10 and 11, "of the seat at a height selected distance from the rear window, at a and at an angle that will project an attention commanding...", should read: --...of the seat at a selected distance from the rear window, at a height and at an angle that will project an attention-commanding...--.

Signed and sealed this 6th day of March 1973.

(SEAL)
Attest:

EDWARD M. FLETCHER, JR.  ROBERT GOTTSCHALK
Attesting Officer  Commissioner of Patents